May 4, 1965     R. T. W. KNIGHTLY     3,181,196
HANDLE OPERATED FOAM GENERATOR AND APPLICATOR
Filed March 4, 1963     3 Sheets-Sheet 1
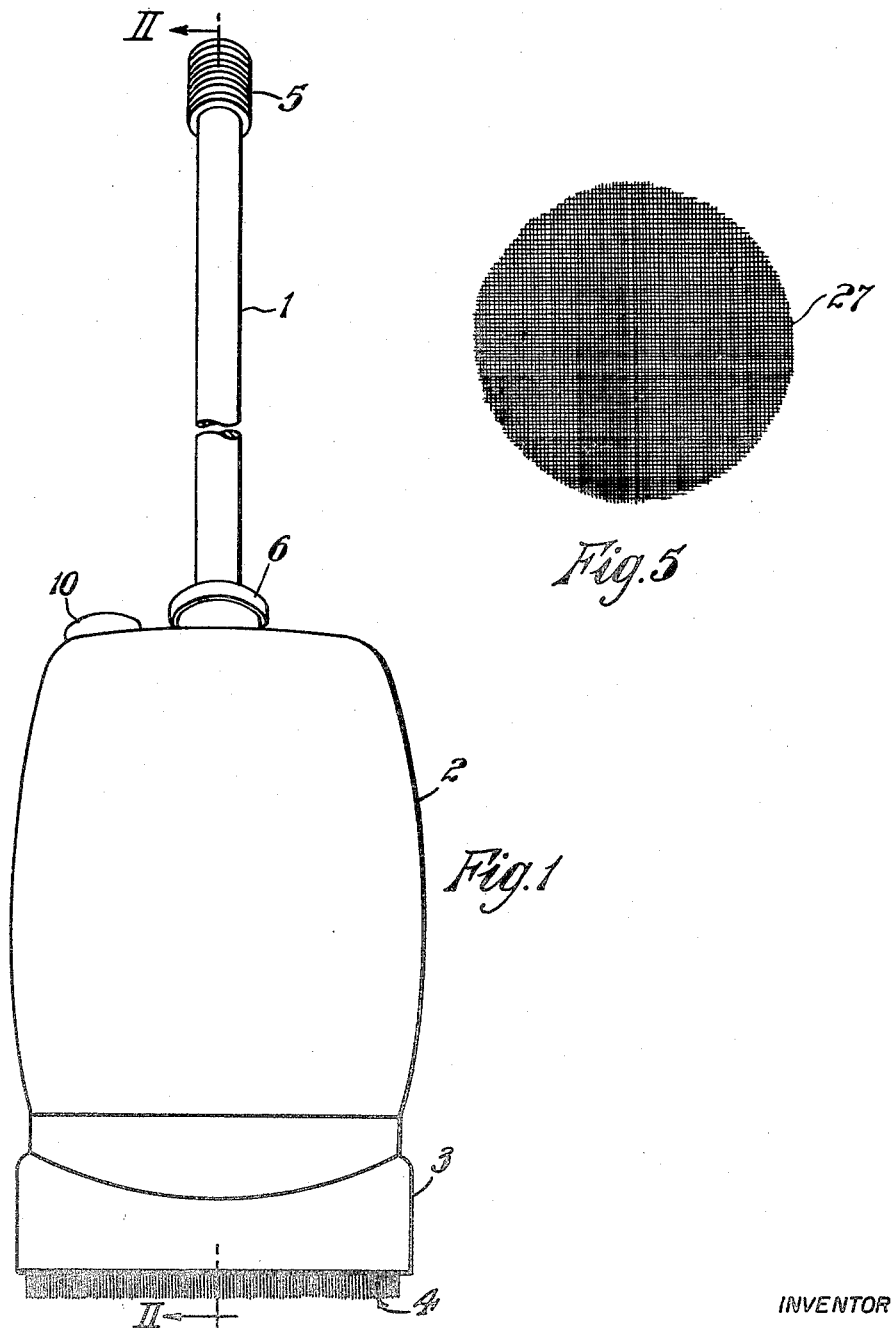
INVENTOR
RICHARD THOMAS WILLIAM KNIGHTLY
his ATTORNEYS May 4, 1965  R. T. W. KNIGHTLY  3,181,196
HANDLE OPERATED FOAM GENERATOR AND APPLICATOR
Filed March 4, 1963  3 Sheets-Sheet 2
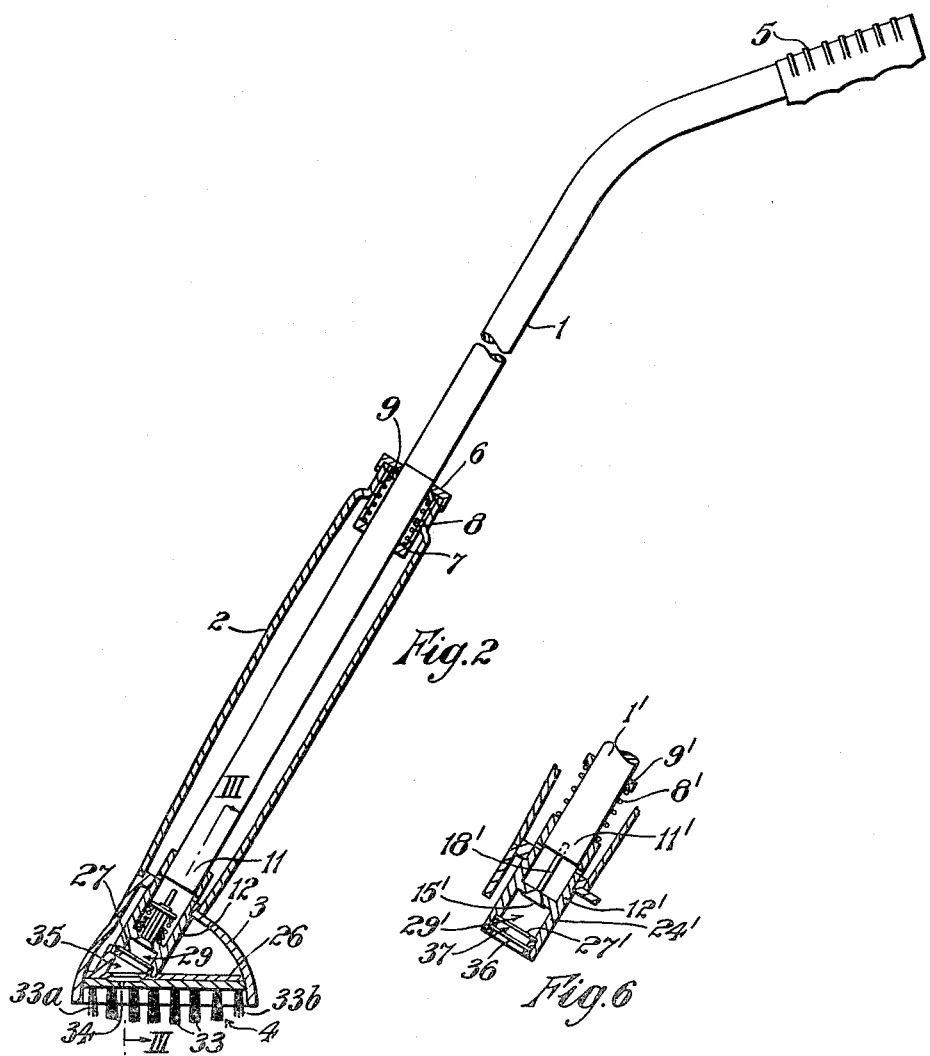
INVENTOR
RICHARD THOMAS WILLIAM KNIGHTLY
his ATTORNEYS May 4, 1965   R. T. W. KNIGHTLY   3,181,196
HANDLE OPERATED FOAM GENERATOR AND APPLICATOR
Filed March 4, 1963   3 Sheets-Sheet 3
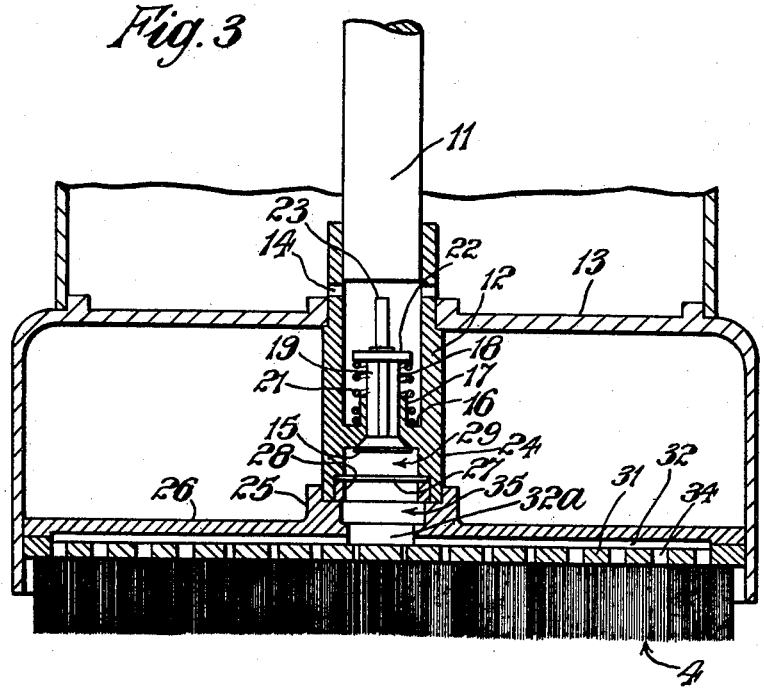
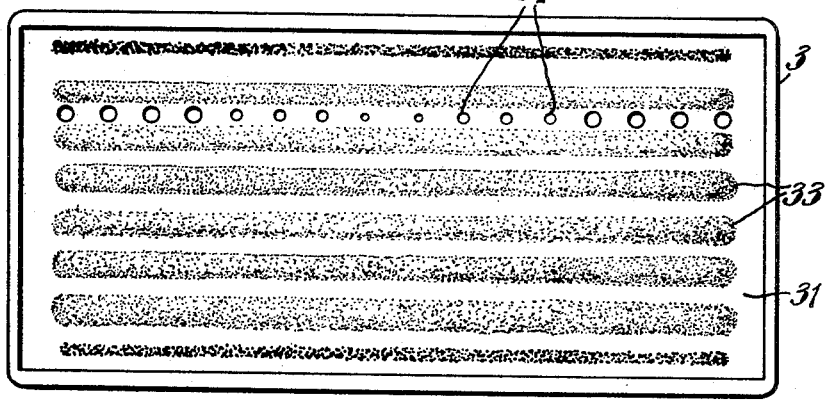
INVENTOR
RICHARD THOMAS WILLIAM KNIGHTLY
his ATTORNEYS

United States Patent Office 3,181,196
Patented May 4, 1965

3,181,196
HANDLE OPERATED FOAM GENERATOR
AND APPLICATOR
Richard Thomas William Knightly, Eastcote, Middlesex,
England, assignor to Lever Brothers Company, New
York, N.Y., a corporation of Maine
Filed Mar. 4, 1963, Ser. No. 262,522
Claims priority, application Great Britain, Mar. 9, 1962,
9,277/62
5 Claims. (Cl. 15—525)

This invention relates to producing foam and to treating surfaces with foam, particularly to cleaning surfaces with foam.

Surfaces can be treated by foaming a treatnig liquid and then working the foam into or over the surface. For example, carpets can be shampooed by foaming a detergent solution of a type that foams readily when agitated, and then working the foam into the nap of the carpet; the foam can be allowed to dry, and then the dried foam together with any loosened dirt or other foreign matter can be removed by brushing or by means of a vacuum cleaner.

According to one aspect of the invention there is provided a method of generating foam comprising passing a liquid capable of foaming into a chamber containing gas and increasing the pressure in the chamber to force at least part of the contents out through apertures in a wall of the chamber to cause foam to issue from the apertures.

The foam can be applied to a surface and used to treat the surface.

Gas can pass into the chamber after the increase in pressure therein. Preferably, the gas is drawn into the chamber through the apertures; with this arrangement the chamber is alternately subjected to pressure and suction. The increase in pressure can be effected by movement of a piston; the suction can be created by movement of the piston in an opposite direction.

The liquid can be injected into the chamber thereby causing the pressure increase therein.

The foam, possibly containing some free liquid which has not foamed, can issue from said apertures into at least one further chamber containing gas, said increase in pressure also forcing at least part of the contents of said further chamber out through further apertures in a wall of said further chamber to cause foam to issue from said further apertures.

By varying the number of such chambers, the size of the apertures, the number of apertures, and the arrangement of the apertures, the characteristics of the final foam, for example its wetness, can be varied.

For cleaning surfaces having a nap, the lqiuid can be a detergent solution, preferably of the non-soapy type, having the property of foaming readily when agitated.

According to another aspect of the invention there is provided a method of treating a surface comprising alternately drawing air into a chamber and then injecting liquid into the chamber to cause at least some of the liquid to leave the chamber as foam, and applying this foam to the surface.

The liquid can be injected into the chamber in one direction and the air drawn into the chamber in an opposite direction. The air can be drawn into said chamber through an apertured partition and the foam discharged from the chamber at the apertured partition.

According to a further aspect of the invention there is provided a device for generating foam comprising a pump adapted for connection to a supply of liquid and arranged to pump liquid into a chamber, at least part of a wall of the chamber being formed by an apertured partition through which the foam is discharged, the arrangement being such that the pump alternately pumps liquid into the chamber and then draws gas through the apertured partition into the chamber.

The pump can deliver a predetermined dose of liquid to the chamber each time it pumps.

According to yet a further aspect of the invention there is provided a device for treating a surface comprising a reservoir for liquid capable of foaming, a chamber arranged to receive liquid from the reservoir, a partition having a plurality of small apertures therethrough and forming at least part of a wall of the chamber, the partition being formed by a mesh, and applying means arranged to receive discharge from the mesh and apply this discharge to the surface.

Means can be included for increasing the pressure in the chamber to force at least part of the contents through the mesh.

According to yet another aspect of the invention there is provided a device for treating a surface comprising a reservoir for liquid capable of foaming, a chamber having at least part of a wall formed by an apertured partition, means for enabling transfer of liquid from the reservoir into the chamber, means for enabling transfer of gas into the chamber, means for forcing at least part of the contents of the chamber out through the apertured partition, the apertures of the apertured partition being sufficiently small and the general arrangement being such that foam issues from the apertured partition, and means for applying the foam to the surface.

Said means for forcing at least part of the contents out of the chamber can be constituted by means for forcing the liquid into the chamber. Said means for forcing the liquid into the chamber may be arranged alternately to force the liquid into said chamber and then draw gas through said apertured partition into the chamber. Alternatively, separate means can be provided for transferring gas into the chamber.

Said apertured partition may communicate with a second chamber which has part of its wall formed by a second apertured partition, the arrangement being such that foam issues from said second apertured partition. There may be further chambers arranged in series, adjacent chambers communicating with each other through an apertured partition. Two apertured partitions may be placed close to each other or be superimposed upon each other so that the chamber between them is very shallow.

A duct can be arranged to distribute the foam to said applying means; the duct can be provided with a plurality of discharge openings. The duct can be arranged transversely of the device and may be arranged at the top of or above the foam applying means. There can be a space or compartment between an inlet opening to the duct and the, or the last, apertured partition.

A handle can be provided by which the device can be manually manipulated and the handle can be movable relative to the foam applying means, this relative movement operating the means for forcing the contents out of the chamber. Resilient means can be provided for returning the handle and any means operated thereby to their original relative positions as soon as the pressure on the handle is released. Said relative movement can be such that the handle moves relatively to the reservoir; preferably, the handle is moveable telescopically with respect to the reservoir.

The means for forcing the contents out of the chamber can comprise a piston and a cylinder. The piston may be formed by or be attached to an end of the handle. The piston can be normally urged to one end of the cylinder in which position an inlet port or ports is or are open to allow liquid to flow from the reservoir into the cyldiner, and a valve at the other end of the cylinder can control communication between the cylinder and the chamber. In place of the valve, an apertured screen, for example a mesh, can be disposed between the cylinder and the chamber; the apertured screen can be similar to said apertured partition.

The or each apertured partition can be sieve-like. The or each apertured partition can be formed by a mesh, for example a wire mesh or a fabric mesh. A fine nylon or copper gauze is particularly suitable.

The size of each aperture in the or each apertured partition can be less than 0.5 square millimetre. The aperture size is preferably in the range of 0.05 to 0.0005 square millimetre.

The applying means can comprise a brush, a roller, a pad, a sponge, any combination of these, or any other suitable means.

We have found that when cleaning surfaces having a nap, for example, rugs and carpets, the foam can be efficiently worked into or through the nap by a brush. The brush can have stiffer bristles at its back and front edges and softer, or more pliable, bristles in between. The bristles can be made of plastic material, for example nylon.

Viewed from a different aspect, the invention can provide a device for shampooing floor covering or the like having a nap, the device comprising a container for shampoo solution, means for applying the shampoo solution to the floor covering or the like, means for controlling the flow of shampoo solution from the container, and a handle by which the device can be pushed and pulled to and fro over the floor covering or the like, the means for controlling the flow of shampoo solution being operable by movement of the handle. The handle is preferably arranged to move telescopically relative to another part of the device, for example the container. The means for controlling the flow of shampoo solution can comprise a valve, or a pump, or a combination of these. The means for applying the shampoo solution can comprise a roller having a spongy arbsorbent periphery, or a brush, or a combination of these; the shampoo solution may be supplied to the applying means as foam or may be worked into foam thereby.

By way of example, embodiments of the invention will now be described with reference to the accompanying diagrammatic drawings in which:

FIGURE 1 is a front view of a device according to the invention;

FIGURE 2 is a section on the line II—II in FIGURE 1;

FIGURE 3 is a section, on a larger scale, on the line III—III in FIGURE 2;

FIGURE 4 is a plan, on a larger scale, of the bottom of the device;

FIGURE 5 is a plan, on an even larger scale, of a component of the device; and

FIGURE 6 is a section, similar to part of FIGURE 2, of a modification of part of the device.

The device has a handle 1, a reservoir 2, and a lower housing 3 containing a foam applying means 4 in the form of a brush. The reservoir has a filling opening which is closed by a cap 10. The upper end of the handle is bent backwards and terminates in a hand grip 5. The handle is a sliding fit in the top 6 of the reservoir and in a housing 7 mounted inside the top of the reservoir. A spring 8 in the housing 7 engages a collar 9 on the handle 1 to urge the handle to an upper position, as shown in FIGURE 2. The lower end 11 of the handle is a sliding fit in a cylinder 12, and forms a piston therein.

The cylinder 12 passes through and is secured to the bottom 13 of the reservoir 2. There are eight inlet ports 14 in the wall of the cylinder 12 through which the cylinder communicates with the interior of the reservoir 2 when the handle is in its upper position. The lower end of the cylinder is closed by a valve 15 which seats on the lower side of a wall 16 at the bottom of the cylinder 12. A flange 17 projecting upwards from the wall 16 forms a guide for the valve stem 18. The valve stem has four longitudinal flutes 19 to provide passages up to the valve head. A spring 21 engages a washer 22 secured to the valve stem and urges the valve head 15 upwards against its seating. An extension 23 of the valve stem extends to the level of the inlet ports 14 and is spaced a short distance from the piston 11 when the piston is in its upper position.

A cylindrical extension 24 projects downwards from the wall 16 and is secured in a socket 25 formed on a plate 26 extending across the housing 3. A sieve-like partition 27 extends across the interior of the cylindrical extension 24 and is held in place by a ring 28. The partition 27 forms a wall of a chamber 29. The partition 27 is formed by a gauze in the form of a wire mesh, as shown in FIGURE 5; a suitable size mesh is 100 per centimetre so that the area of each aperture in the mesh is approximately 0.005 square millimetre.

A backing member 31 of the brush 4 is secured to the plate 26. A distributing duct 32 is disposed transversely of the device and is formed by grooves in the plate 26 and the backing member 31. The brush has eight rows 33 of bristles, as can be seen in FIGURES 2 and 4. The outer rows 33a, 33b, that is the rows at the back and front of the device, are stiffer than the rows in between which are relatively pliable. The duct 32 communicates with the space between two of the rows 33 by means of discharge openings 34 which increase in size the further they are disposed from the centre of the duct 32, as can be seen in FIGURE 4. The duct has an inlet opening 32a which communicates with a compartment 35 which in turn communicates with the lower side of the apertured partition 27.

In operation, the device is pushed and pulled to and fro by the handle 1 over the surface being treated, a short length of the surface being treated at a time. When the handle is in its upper position, liquid from the reservoir 2 flows into the cylinder 12 through the inlet ports 14. When the device is pushed forwards, the pressure on the handle causes the handle to telescope into the reservoir 2 against the action of the spring 8, the piston 11 making a downward stroke in the cylinder 12. During this downward stroke, the inlet ports 14 close, the piston contacts the extension 23 of the valve stem, the valve 15 is moved downwards away from its seating, and a volume of liquid in the cylinder 12 is injected into the chamber 29 via the flutes 19 in the valve stem. The downward movement of the piston 11 is limited by engagement of the washer 22 with the top of the flange 17. When the device is pulled backwards, the handle is returned to its upper position by the combined action of the pulling on the handle, the spring 8, and the spring 21; the valve 15 will be returned to its seating by the spring 21. During the upward movement of the piston 11, a suction will be applied to the chamber 29 until the piston has moved upwards a sufficient distance to allow the valve 15 to close; further upward movement of the piston opens the ports 14 and allows more liquid to flow into the cylinder 12. Whilst the chamber 29 is subjected to suction, air is drawn through the discharge openings 34, the duct 32, the compartment 35, and through the apertured partition 27 into the chamber 29. The chamber 29 should now contain air and liquid. The next time the device is pushed forward, the downward movement of the piston injects another dose of liquid into the chamber 29 and at the same time increases the pressure in the chamber. This causes at least some of the contents of the chamber to be forced out through the apertured partition 27. The contents issue from the apertured partition as foam, although the foam may be wet, that is contain some liquid still in a continuous liquid phase. On further reciprocation of the device over the surface being treated, more foam is generated and the foam passes into the duct 32 and is discharged through the openings 34 into the space between two of the rows 33 of bristles. The movement of the rows 33 of bristles over the surface works the foam over and into the surface. The flexing of the bristles may create further foam. The outer rows 33a, 33b of stiffer bristles tend to limit the flexing outwards of the more pliable bristles; further, if the surface being treated has a nap, these stiffer bristles tend to comb the nap.

The precise manner in which the foam is generated and conveyed appears complex, but I believe that the small apertures in the partition 27 cause an intimate mingling of the air and liquid and also tend to prevent or hinder foam bubbles being sucked back into the chamber 29 although allowing the passage of air into the chamber.

The foam discharged through the openings 34 may be wet; that is, in a volume of foam there may be a volume of liquid and gas in the form of bubbles, and a volume of free liquid. The degree of wetness of the foam can be considered as the volume of free liquid divided by the total volume of the foam, and this can be multiplied by 100 to express it as a percentage.

The degree of wetness of the foam can be varied by varying the size and number of the apertures in the apertured partition 27 and by having more than one such partition.

FIGURE 6 shows a modification of the device shown in the other figures. The modified device is intended to give a less wet foam. Parts in FIGURE 6 similar to those in FIGURE 2 are denoted by the same reference numerals with the addition of an index. The main modification is that the cylindrical extension 24' is lengthened and in addition to the apertured partition 27' there is a second similar apertured partition 36. The apertured partitions 27' and 36 are spaced apart to form a second chamber 37. Also, the valve 15 is replaced by an ordinary poppet type valve 15', the stem 18' of which is screwed into the piston 11'. The valve spring 21 is omitted and the collar 9' is secured to the handle 1' near the piston 11' with the spring 8' located between the collar 9' and the upper end of the cylinder 12'.

The modified device operates substantially as before except that the foam issuing at the apertured partition 27' is then forced through the apertured partition 36. We believe the second apertured partition functions in a similar manner to the apertured partition 27' and causes at least some of the free liquid in the foam to be converted into foam bubbles so that the foam issuing from the second apertured partition 36 is less wet than that issuing from the apertured partition 27'.

The device could be modified by the addition of further apertured partitions 36 and the formation of further chambers 37 to produce foam having different characteristics.

The devices shown are particularly suitable for shampooing carpets or other floor coverings having a nap. The shampoo solution can be a detergent solution of the non-soapy type having the property of foaming readily when agitated. We have found that good results can be obtained by arranging for the foam discharged into the brush to be moderately wet and allowing the flexing of the bristles and movement of the brush to further foam the moderately wet foam.

It will be appreciated that by arranging for the telescopic movement of the handle to pump liquid from the reservoir, a predetermined amount of foam is produced each time the device is pushed forward. Consequently, by reciprocating the device through substantially the same distance each time, the foam can be uniformly applied to the surface being treated.

These devices can be provided with means for locking the handle relative to the reservoir to render the pump inoperative. Such means is useful when shampooing an extra dirty patch of carpet etc.: after sufficient foam has been applied to this patch, the locking means is actuated to render the pump inoperative and then the device is used to work this foam further into this patch without more foam being generated.

What is claimed is:

1. A device for applying foam to a surface comprising a reservoir for a liquid capable of foaming, a cylinder in a lower portion of said reservoir, said cylinder having an inlet port in an upper end communicating with said reservoir and an outlet in its lower end, normally closed valve means for said outlet, a manipulating handle movable relative to said reservoir, piston means fixed to said handle slidably movable in said cylinder, a chamber below said cylinder and communicating with said outlet to receive liquid from said cylinder, a perforated partition member in said chamber and an applicator mounted on said reservoir having passages communicating with said chamber downstream of said perforated member, said piston being movable downwardly by said handle to cover said inlet port and open said valve means substantially simultaneously and force liquid out of said cylinder into said chamber and through said perforated member and said piston being movable upwardly while said valve means is open and said inlet port is covered to create a reduced pressure in said chamber and said cylinder, and thereafter to close said valve means and uncover said inlet means whereby downward and upward movement of said piston causes said liquid to be foamed and discharged into said applicator.

2. The device set forth in claim 1 in which said perforated partition member comprises screen mesh.

3. The device set forth in claim 1 comprising a plurality of screen mesh partition members in said chamber in spaced apart relation.

4. The device set forth in claim 1 in which said valve means comprises a valve seat, a valve plug, a spring biasing said valve plug toward said seat, and a valve stem on said plug engageable with said piston for moving said valve plug away from said seat on downward movement of said piston.

5. The device set forth in claim 4 in which said valve stem is fixed to said piston.

References Cited by the Examiner
UNITED STATES PATENTS

| | | |
|---|---|---|
| 1,457,895 | 6/23 | Campanella. |
| 2,735,125 | 2/56 | Erbs _____ 15—320 X |
| 2,932,840 | 4/60 | Lathrop _____ 15—532 |
| 2,975,462 | 3/61 | Yonkers et al. _____ 15—532 |
| 2,976,559 | 3/61 | Yonkers et al. _____ 15—532 |
| 3,094,737 | 6/63 | Baar et al. _____ 15—588 |
| 3,108,312 | 10/63 | Ballantyne _____ 15—525 |

CHARLES A. WILLMUTH, *Primary Examiner.*